No. 874,924. PATENTED DEC. 31, 1907.
F. BARTZ & F. A. WYGANT.
RECEPTACLE FOR COFFEE MILLS.
APPLICATION FILED JUNE 5, 1907.
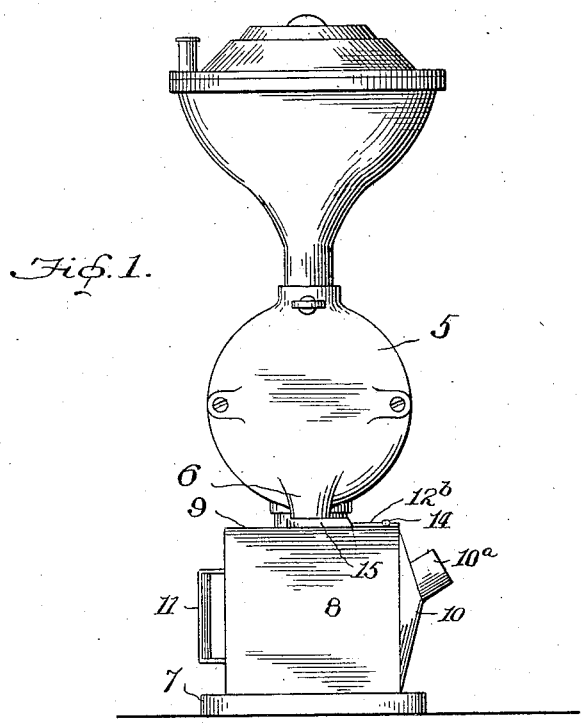
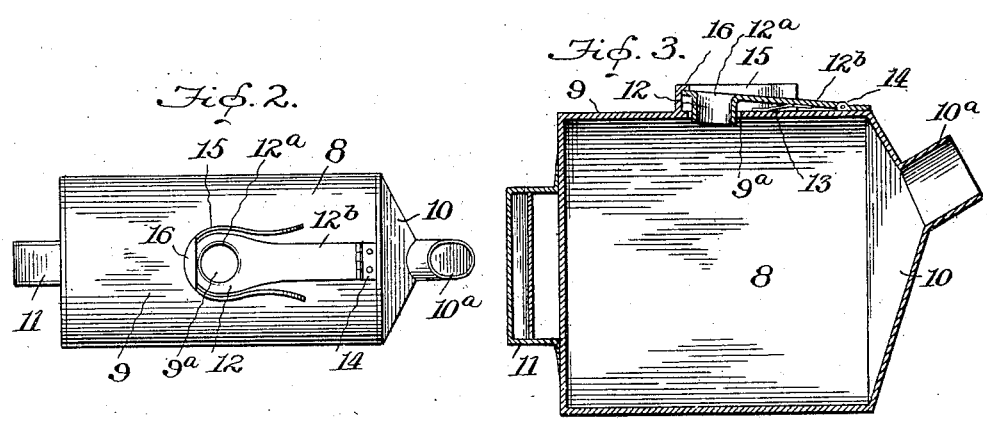
Witnesses
R. J. Beall
W. S. Duvall
Inventors
Frank Bartz
and
Frederick A. Wygant.
By John B. Thomas & Co.
Attorneys

UNITED STATES PATENT OFFICE.

FRANK BARTZ AND FREDERICK A. WYGANT, OF HORNELL, NEW YORK, ASSIGNORS TO BARTZ, WYGANT & BROWN, OF HORNELL, NEW YORK, A CORPORATION.

RECEPTACLE FOR COFFEE-MILLS.

No. 874,924.

Specification of Letters Patent.

Patented Dec. 31, 1907.

Application filed June 5, 1907. Serial No. 377,423.

*To all whom it may concern:*

Be it known that we, FRANK BARTZ and FREDERICK A. WYGANT, citizens of the United States, residing at Hornell, in the county of Steuben and State of New York, have invented certain Improvements in Receptacles for Coffee-Mills, of which the following is a specification.

This invention is an improvement in receptacles for coffee mills, and relates more especially to the receptacles which are employed for catching the coffee as it is delivered from the discharge-spout of the mill.

The primary object of the invention is to provide a closed receptacle which may be easily slid under the discharge-spout of the coffee-mill and will engage the same in such manner as to direct all the coffee into the receptacle and prevent spilling or waste, the said receptacle having a spout at one end for convenience in emptying its contents into a paper-bag.

With this principal object in view the invention consists of a closed receptacle or coffee-cup having an inlet opening at its upper end and a spring-actuated plate or funnel let into the opening and adapted to receive and fit against the end of the discharge-spout of the coffee-mill, whereby the coffee which is discharged from the aforesaid spout will be directed or led into the receptacle or coffee-cup.

The invention further consists in the particular construction and arrangement of the parts, as hereinafter fully described in the specifications and specifically set forth in the appended claims.

In the accompanying drawings, which form a part of this specification:—Figure 1 illustrates the application of the invention. Fig. 2 is a plan view of the receptacle or coffee receiving cup. Fig. 3 is a vertical sectional view through the same. Fig. 4 is a view illustrating a modification of the funnel plate.

Like numerals of reference indicate like parts in all the figures of the drawings.

In Fig. 1 of the drawings we have illustrated the application of our invention, and therefore have shown one style of coffee-mill; but as will be obvious the device may be used in connection with any other type of coffee-mill having the usual discharge-spout. In this illustration the coffee-mill 5 is provided with a depending discharge-spout 6, and with a platform 7, the latter being located below the spout to receive the receptacle or cup into which the coffee is deposited.

In carrying out our invention we employ a closed receptacle or tin box 8, which may be of any approved shape, in the present instance being provided with a rounded top 9, and a funnel-shaped end 10 with a spout $10^a$ through which the contents of the receptacle may be discharged. The end of the receptacle opposite the discharge-spout thereof is provided with a handle 11, by which the said receptacle is manipulated. In some instances it may be found desirable to change the location of either the spout or the handle, or both, and also to change the shape of the body of the receptacle, as these are mere details which do not affect the purpose of our invention.

In the top of the receptacle there is an opening $9^a$, which is adapted to receive the coffee from the mill, and in order that the coffee may be discharged from the mill into the receptacle without the possibility of spilling we provide the receptacle with a plate or funnel 12, the funnel-portion of which is let into the opening $9^a$ and is adapted to fit snugly against the end of the discharge-spout 6 of the coffee-mill so as to practically form a continuation of said spout which will extend well into the receptacle. This funnel is actuated or pressed upward by means of a spring 13, and the receptacle is of such height with respect to the platform 7 and discharge-spout 6 of the coffee-mill that the funnel will be slightly depressed when the said receptacle is slid into position under the spout, and this causes a close fit between the said funnel and spout. In order to provide a closer fit between these parts the upper part of the funnel is beveled, as at $12^a$, and of course the lower end of the spout may be correspondingly beveled. In the present instance the funnel is provided with a plate or member $12^b$, by which it is attached to the receptacle, the preferred form of attachment being by means of a hinge-joint 14. The flat spring 13 bears against the underside of the plate or member $12^b$ of the funnel, and acts to press the same upward. This plate or member $12^b$ presents an inclined surface upon which the discharge-spout of the coffee-mill rides or travels to the funnel and therefore acts as an operating-member for the funnel.

For the purpose of guiding the receptacle so that the discharge-spout of the mill will properly engage the funnel we provide a curved plate or flange 15, which is attached to the top of the receptacle and extends partially around the inlet-opening 9ª and at its ends is flared outward, as shown in Fig. 2. At the curved end of this guide plate or flange is a lip 16, which serves the two-fold purpose of limiting the upward movement of the funnel 12 and as a stop which engages the discharge-spout of the mill so as to locate the same exactly over the opening in the funnel. It will be noted, of course, that the side members of the guide plate or flange 15 extend substantially parallel with and at opposite sides of the attaching member 12ᵇ of the funnel, and that as the receptacle is slid in place the spout of the mill will be guided along said plate until it strikes the lip 16, and in this position the spring 13 will force the funnel upward in close contact with the spout.

By the provision of this funnel the coffee which is discharged from the mill will pass through the discharge-spout 6, and on through the funnel 12, and the lower end of the latter being well within the receptacle there is no possibility of any of the coffee being spilled or wasted.

As the funnel attachment is a part of the receptacle it is only necessary, in using the receptacle, to slide the same under the discharge-spout of the coffee-mill and so that the spout will pass between the guide flanges 15 and contact with the lip 16, when the funnel will be pressed upward by the spring so as to closely fit the spout. In removing the receptacle it is only necessary to grasp the handle 11 and slide the same from beneath the spout, the funnel yielding so that it will become disengaged from said spout.

Of course any other means may be employed for supporting the funnel so that it will yieldingly engage the end of the discharge-spout of the coffee-mill, and in Fig. 4 we have shown the funnel 17 and its supporting plate or member 18 formed of a single piece, and in this instance the member is of spring metal and bent for attachment to the receptacle and so that the part carrying the funnel will yield.

It will be apparent, therefore, that various modifications or changes may be made in the construction and arrangements of parts or details, without sacrificing any of the advantages of our invention, and all within the spirit and scope of our claims.

Having thus described our invention, what we claim as new, and desire to secure by Letters-Patent, is:—

1. The combination with a coffee mill having a spout, of a receptacle, a support therefor, said receptacle having an opening in its top, and a funnel let into said opening and adapted to yieldingly engage the spout when the receptacle is placed upon the support.

2. The combination with a coffee mill having a spout, of a receptacle, a support therefor, said receptacle having an opening in its top, and a spring-actuated funnel attached to the receptacle to extend into the opening and adapted to engage the spout when said receptacle is slid upon the support into position under said spout.

3. The combination with a coffee mill having a spout, of a receptacle, a support therefor, said receptacle having an opening in its top, a spring-actuated funnel attached to the receptacle to extend into the opening, and a guide-flange extending around the funnel, said funnel being adapted to engage the spout when the receptacle is slid upon the support into position under the spout.

4. The combination with a coffee mill having a spout, of a receptacle, a support therefor, said receptacle having an opening in its top, a spring-actuated funnel attached to the receptacle to extend into the opening and having an operating-member at one side, and a guide-flange extending partially around the funnel, whereby said funnel will engage the spout when the receptacle is slid upon the support into position under the spout.

5. The combination with a coffee mill having a spout, of a receptacle, a support therefor, said receptacle having an opening in its top, and a spring-actuated funnel attached to the receptacle to extend into the opening and having an operating member at one side, whereby said funnel will be depressed by the spout and yieldingly engage the same when the receptacle is slid upon the support into position under said spout.

6. The combination with a coffee mill having a spout, of a receptacle, a support therefor, said receptacle having an opening in its top, a spring-actuated funnel attached to the receptacle to extend into the opening, an operating member at one side of said funnel, and a guide-flange extending around the opposite side of the funnel and at each side of the operating-member, whereby said funnel will be depressed by the spout and engage the same when the receptacle is slid upon the support into position under said spout.

7. The combination with a coffee mill having a spout, of a receptacle, a support therefor, said receptacle having an opening in its top, a spring-actuated funnel attached to the receptacle so as to extend into the opening, a guide-flange on the receptacle extending partially around the funnel and having a lip for limiting the upward movement of the latter, the parts being arranged whereby the funnel will engage the spout when the receptacle is slid into position on the support.

8. The combination with a coffee mill having a spout, of a receptacle, a support therefor, said receptacle having an opening in its top, a spring-actuated funnel attached to the receptacle so as to extend into the opening, an operating member at one side of the funnel adapted to be depressed by the spout and cause the engagement of the funnel therewith when the receptacle is slid upon the support, and a guide-flange on the receptacle extending partially around the funnel and having a lip which limits the upward movement of the latter.

9. The combination with a coffee mill having a spout, of a receptacle, a support therefor, said receptacle having an opening in its top, a spring plate attached to the receptacle and inclined upwardly, and a funnel at the free end of the plate, the parts being so arranged that the inclined plate and funnel will be engaged by the spout as the receptacle is slid on the support into position under said spout.

10. The combination with a coffee mill having a spout, of a receptacle, a support therefor, said receptacle having an opening in its top, a spring-actuated plate attached to the receptacle and inclined upwardly, a funnel at the free end of the plate, and a guide-flange for guiding the spout along the plate and into the funnel, the parts being so arranged that the spout will pass along the plate and engage the funnel as the receptacle is slid into position on the support.

11. The combination with a coffee mill having a spout, of a receptacle, a support therefor, said receptacle having an opening in its top, a spring-actuated plate attached to the receptacle and inclined upwardly, a funnel at the free end of the plate, a guide-flange on the receptacle extending around the rear end of the funnel and along opposite sides of the inclined plate, and a lip on said flange for limiting the upward movement of the funnel, the parts being so arranged that the spout will depress the plate and engage the funnel as the receptacle is slid upon the support into position under said spout.

In testimony whereof we have signed our names to this specification in the presence of two subscribing witnesses.

FRANK BARTZ.
FRED. A. WYGANT.

Witnesses:
DAVID M. HURLBURT,
L. G. HOLLANDS.